United States Patent
Odaka et al.

(10) Patent No.: US 7,821,802 B2
(45) Date of Patent: Oct. 26, 2010

(54) CONTROL METHOD FOR DIRECT POWER CONVERTER

(75) Inventors: Akihiro Odaka, Hino (JP); Ikuya Sato, Hino (JP); Yasuhiro Tamai, Hino (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 519 days.

(21) Appl. No.: 11/882,288

(22) Filed: Jul. 31, 2007

(65) Prior Publication Data

US 2008/0049469 A1    Feb. 28, 2008

(30) Foreign Application Priority Data

Jul. 31, 2006   (JP) .............................. 2006-207507

(51) Int. Cl.
    *H02M 5/22* (2006.01)
(52) U.S. Cl. .................. 363/164; 363/157; 363/159
(58) Field of Classification Search ................. 363/157, 363/159, 164, 165
    See application file for complete search history.

(56) References Cited

U.S. PATENT DOCUMENTS

| | | | |
|---|---|---|---|
| 4,074,348 A | | 2/1978 | Salzmann et al. |
| 4,652,989 A | * | 3/1987 | Kurosawa et al. ........... 363/161 |
| 4,833,588 A | * | 5/1989 | Schauder ..................... 363/159 |
| 5,886,893 A | * | 3/1999 | Asai et al. .................... 363/161 |
| 2009/0175059 A1 | * | 7/2009 | Sakakibara .................. 363/36 |

OTHER PUBLICATIONS

Jun-ichi Ito, Ikuya Sato, and Shigeo Konishi, "An Improved Method of Input and Output Waveforms for the Matrix Converter Based on Virtual AC/DC/AC Conversion" SPC-02-90/IDE-02-31, 2002, pp. 75-80.

Jun-ichi Itoh, Hirokazu Kodachi, Akihiro Odaka, Ikuya Sato, Hideki Ohguchi, and Hidetoshi Umida, "A High Performance Control Method for the Matrix Converter Based on PWM generation of Virtual AC/DC/AC Conversion" 2004, pp. 303-308.

* cited by examiner

*Primary Examiner*—Jeffrey L Sterrett
*Assistant Examiner*—Fred E Finch, III
(74) *Attorney, Agent, or Firm*—Rabin & Berdo, PC

(57) ABSTRACT

A power converter directly converting an AC voltage into an AC voltage of any desired magnitude and frequency by turning bidirectional switches ON and OFF without employing any energy buffer, where the peak values of output phase voltage command values are limited, to bring the amplitude of an output line voltage to, at most, 0.866 times the amplitude of the supply line voltages. By way of example, the peak-value limit of the output phase voltage command values is set so that the maximum value of the output phase voltage command values becomes, at most, 0.75 times the maximum value of supply phase voltages, while the minimum value thereof becomes, at least, 0.75 times the minimum value of the supply phase voltages. This control method for the direct power converter dispenses with an expensive dedicated motor, and permits a reduction in cost of the control apparatus as a whole.

12 Claims, 10 Drawing Sheets

CONTROL METHOD FOR DIRECT POWER CONVERTER

BACKGROUND OF THE INVENTION

1. Field of the Invention

The present invention relates to a control method for a direct power converter wherein an AC voltage is directly converted into an AC voltage having a desired magnitude and frequency, without employing a large energy buffer such as an electrolytic capacitor.

2. Description of the Related Art

FIG. 12 is a configuration diagram showing the main circuit of a matrix converter that is provided with nine bidirectional switches, as a typical example of a direct power converter of the type specified above.

Referring to the figure, numeral 10 designates a three-phase AC power supply, numeral 20 designates a filter which includes a reactor and capacitors, letters R, S and T designate AC input terminals, and numeral 30 designates the matrix converter in which the nine bidirectional switches SW capable of controlling currents bidirectionally are connected between the AC input terminals R, S and T and AC output terminals U, V and W. The bidirectional switches SW are turned ON/OFF, whereby three-phase AC input voltages are directly derived and are converted into three-phase AC voltages of any desired magnitude and frequency.

FIG. 13 is the block diagram of a control apparatus for a matrix converter as is stated in "An Improved Method of Input and Output Waveforms for the Matrix Converter Based on Virtual AC/DC/AC Conversion", Jun-ichi Itoh, Ikuya Sato, Shigeo Konishi, SPCO2-90/IEA-02-31, 2002; and "A High Performance Control Method for the Matrix Converter Based on PWM generation of Virtual AC/DC/AC Conversion", Jun-ichi Itoh, Hirokazu Kodachi, Akihiro Odaka, Ikuya Sato, Hideki Ohguchi, Hidetoshi Umida, National Convention Record, IEEJ-Industry Applications Society, pp. I-303-I-308, 2004. In these non-patent documents, control is performed with a matrix converter 30 regarded as a virtual rectifier 30A and a virtual inverter 30B, as shown in FIG. 14. Referring to FIG. 14, reference SWA denotes each of the semiconductor switching elements that constitute the virtual rectifier 30A, while reference $SW_B$ denotes each of the semiconductor switching elements that constitute the virtual inverter 30B.

One-leg modulation is employed for the control of the virtual rectifier 30A for the purpose of increasing the utilization factor of supply voltages. As shown in FIG. 13, virtual rectifier control means 41 obtains a modulation signal $\lambda_{REC}$ for the virtual rectifier 30A from phase input current command values $I_R^*$, $I_S^*$ and $I_T^*$, so as to generate PWM pulses for a current type PWM rectifier.

The details of the one-leg modulation are stated in, for example, the aforementioned non-patent document "An Improved Method of Input and Output Waveforms for the Matrix Converter Based on Virtual AC/DC/AC Conversion", and shall therefore be omitted from description here.

On the other hand, regarding the control of the virtual inverter 30B, as shown in FIG. 13, the amplitude command value $V_{out}^*$ of output phase voltages and phase sinusoidal command values $V_{U0}^*$, $V_{V0}^*$ and $V_{W0}^*$ are multiplied by multiplication means 421 to become the reference signals of the output phase voltages, thereby to obtain output phase voltage command values $V_U^*$, $V_V^*$ and $V_W^*$. Besides, in the case of employing one-leg modulation for the control of the virtual rectifier 30A, the fluctuation of a supply frequency component arises in a virtual DC link voltage $E_d$ in FIG. 14. For the purpose of compensating the fluctuation, therefore, the output phase voltage command values $V_U^*$, $V_V^*$ and $V_W^*$ are divided by the virtual DC link voltage $E_d$ in division means 422, thereby to obtain modulation signals $\lambda_U^*$, $\lambda_V^*$ and $\lambda_W^*$ for the virtual inverter 30B.

The modulation signal $\lambda_{REC}$ of the virtual rectifier 30A and the modulation signals $\lambda_U^*$, $\lambda_V^*$ and $\lambda_W^*$ of the virtual inverter 30B as obtained above are synthesized as control commands by control command synthesis means 43, and compared with the triangular wave of a carrier, thereby to obtain the PWM control signals (ON/OFF signals) of the nine bidirectional switches SW of the matrix converter 30. Incidentally, the method for synthesis of the modulation signals and the generation method for the PWM control signals are also omitted from description.

Meanwhile, in the matrix converter, as stated in "An Improved Method of Input and Output Waveforms for the Matrix Converter Based on Virtual AC/DC/AC Conversion", the maximum effective value of a sinusoidal voltage which can be outputted without distortion becomes 0.866 times the effective value of a supply voltage. In a case where a sinusoidal voltage exceeding the maximum effective value is to be outputted, a large number of harmonic components that are determined by the frequency of the supply voltage are contained in an output voltage. Especially in a case where the supply frequency and the output frequency are different, the waveform of the output voltage changes in every cycle of output.

By way of example, FIG. 15 shows waveforms in the case where, when the effective value of supply line voltage is 200 V, the control command of an output line voltage is set at a sinusoidal voltage whose effective value is 188 V (0.94 times the effective value of the supply line voltages). Referring to the figure, voltages $V_{RS}$, $V_{ST}$ and $V_{TR}$ are the supply line voltages, and $-V_{RS}$, $-V_{ST}$ and $-V_{TR}$ indicate the inverted voltages of the respective supply line voltages $V_{RS}$, $V_{ST}$ and $V_{TR}$. The output line voltage $V_{UV}$ has had harmonic components ascribable to the PWM modulation removed in order to facilitate illustration.

Here, in a case, for example, where the load of the matrix converter is a motor and where the rated voltage of the motor is equal to the supply voltages, the matrix converter needs to output a voltage effective value, which is at least 0.866 times the supply voltage effective value, in accordance with the rated voltage of the motor. In this case, however, the manner of distortion of the waveform changes every cycle of output as shown in FIG. 15, with the result that nonuniform rotation of the motor and the occurrence of noise from the motor are incurred.

Accordingly, problems arise in the prior art in that the apparatus as a whole becomes expensive because it is necessary to use an expensive dedicated motor with a rated voltage that is low as compared with the supply voltages.

SUMMARY OF THE INVENTION

In view of the above problem, an object of the present invention is to provide a control method for a direct AC-AC power converter that dispenses with the need for an expensive dedicated motor, so as to reduce the cost of the apparatus as a whole.

In order to accomplish the above object, an object of a control method for a direct AC-AC power converter includes, in a direct power converter wherein an AC voltage is directly whole converted into an AC voltage of any desired magnitude and frequency by turning bidirectional switches ON/OFF without employing an energy buffer; in comprising the step of controlling the direct power converter by using final output voltage command values which have been obtained by limiting peak values of output voltage command values of the direct power converter in accordance with magnitudes of supply voltages.

A further object of a control method for a direct power converter includes, in a direct power converter wherein an AC voltage is directly converted into an AC voltage of any desired magnitude and frequency by turning bidirectional switches ON/OFF without employing an energy buffer; in comprising the step of controlling the direct power converter by using final modulation signals which have been obtained by limiting peak values of modulation signals of the direct power converter in accordance with magnitudes of supply voltages.

A still further object of a control method for a direct power converter includes, in a control method for a direct power converter, wherein an amplitude of an output line voltage is made, at most, 0.866 times an amplitude of a supply line voltage by limiting the peak values of the output phase voltage command values.

Another object of a control method for a direct power converter includes, in a control method for a direct power converter, wherein a peak-value limitation value of the output phase voltage command values is set at a value at which a maximum value of the output phase voltage command values becomes, at most, 0.75 times a maximum value of the supply phase voltages, while a minimum value thereof becomes, at least, 0.75 times a minimum value of the supply phase voltages.

Yet another object of a control method for a direct power converter includes, in a control method for a direct power converter, wherein the peak-value limitation value of the output phase voltage command values which have been obtained by multiplying the original output phase voltage command values by a correction coefficient that equalizes an effective value of the output line voltage to a command value is set at a value at which the maximum value of the output phase voltage command values becomes, at most, 0.75 times the maximum value of the supply phase voltages, while the minimum value thereof becomes, at least, 0.75 times the minimum value of the supply phase voltages.

Another control method for a direct power converter includes, in a control method for a direct power converter, wherein a waveform of the output phase voltage command values is made a trapezoidal wave or a square wave in which the maximum value of the output phase voltage command values is, at most, 0.75 times the maximum value of the supply phase voltages, while the minimum value thereof is, at least, 0.75 times the minimum value of the supply phase voltages.

Another object of a control method for a direct power converter includes, in a control method for a direct power converter, wherein final modulation signals which have been obtained by adding a correction signal of identical phase and identical magnitude to modulation signals generated from the plurality of output phase voltage command values whose maximum value and minimum value are limited are used as control commands for the direct power converter.

Another object of a control method for a direct power converter includes, in a control method for a direct power converter, wherein the correction signal is set so that the final modulation signal for at least one phase of an output side of the direct power converter may become 1.0 or −1.0.

Another object of a control method for a direct power converter includes, in a control method for a direct power converter, wherein the control method is employed in case of outputting a voltage being, at least, an effective value of a sinusoidal voltage that the direct power converter can output without distortion.

According to the invention, even in a case where a direct power converter outputs a voltage effective value that is 0.866 times a supply-voltage effective value, the distorted manner of a waveform does not change every cycle of output, and hence, the nonuniform rotation of a motor and noise arising from the motor can be prevented in driving the motor as a load. Accordingly, a countermeasure such as the use of an expensive dedicated motor whose rated voltage is low as compared with a supply voltage is dispensed with, and the cost of the whole apparatus can be lowered.

DESCRIPTION OF THE PREFERRED EMBODIMENTS

Now, embodiments of the present invention will be described in conjunction with the drawings.

Figure 1:
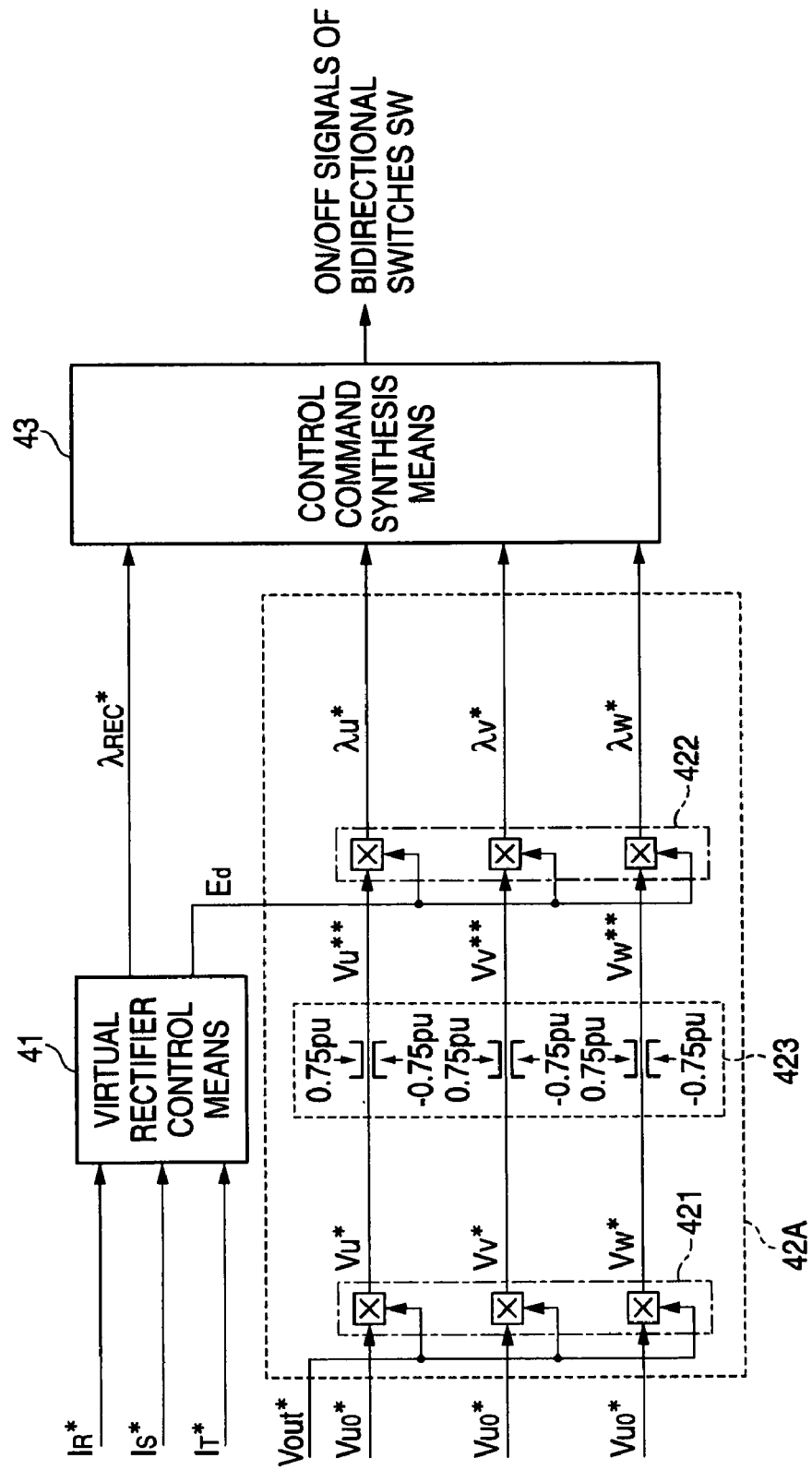
FIG. 1 is a block diagram showing a control apparatus according to a first embodiment of the present invention.
Figure 12:
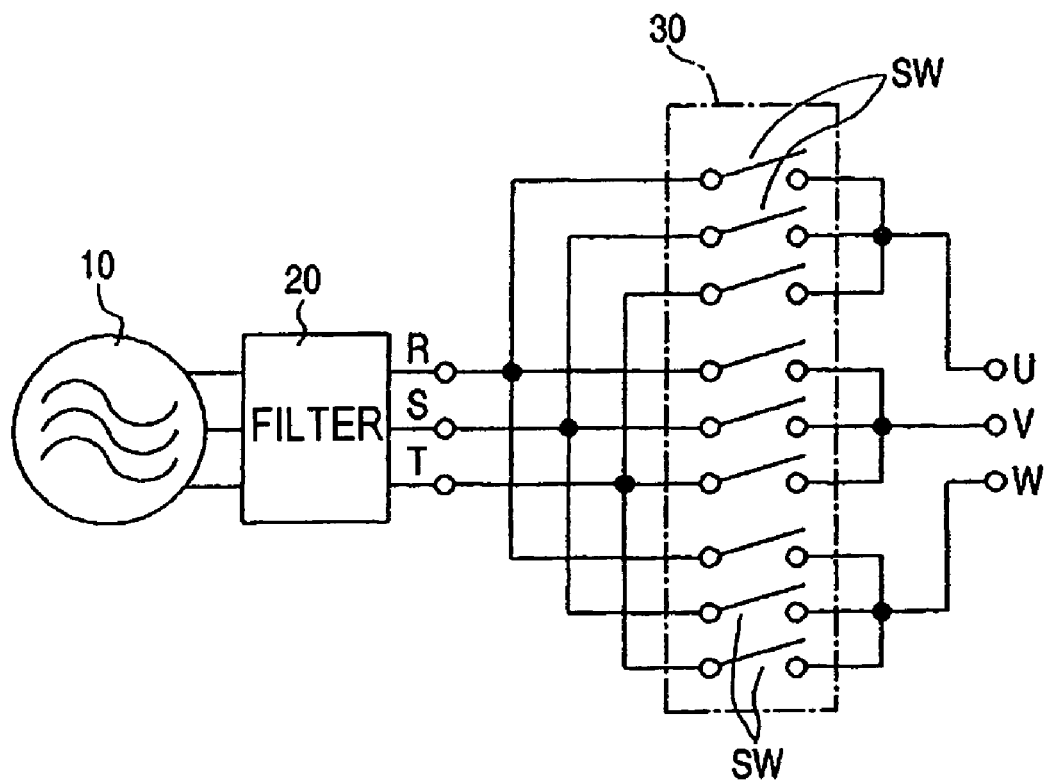
FIG. 12 is a configuration diagram of the main circuit of a matrix converter.

First, FIG. 1 is the block diagram of a control apparatus according to the first embodiment of the invention. Incidentally, although various schemes are considered as a control method for a direct power converter such as matrix converter, this embodiment will be described concerning the case where the matrix converter 30 shown in FIG. 12 is controlled by the virtual AC/DC/AC conversion scheme stated in the non-patent documents 1 and 2 mentioned before.

Figure 13:
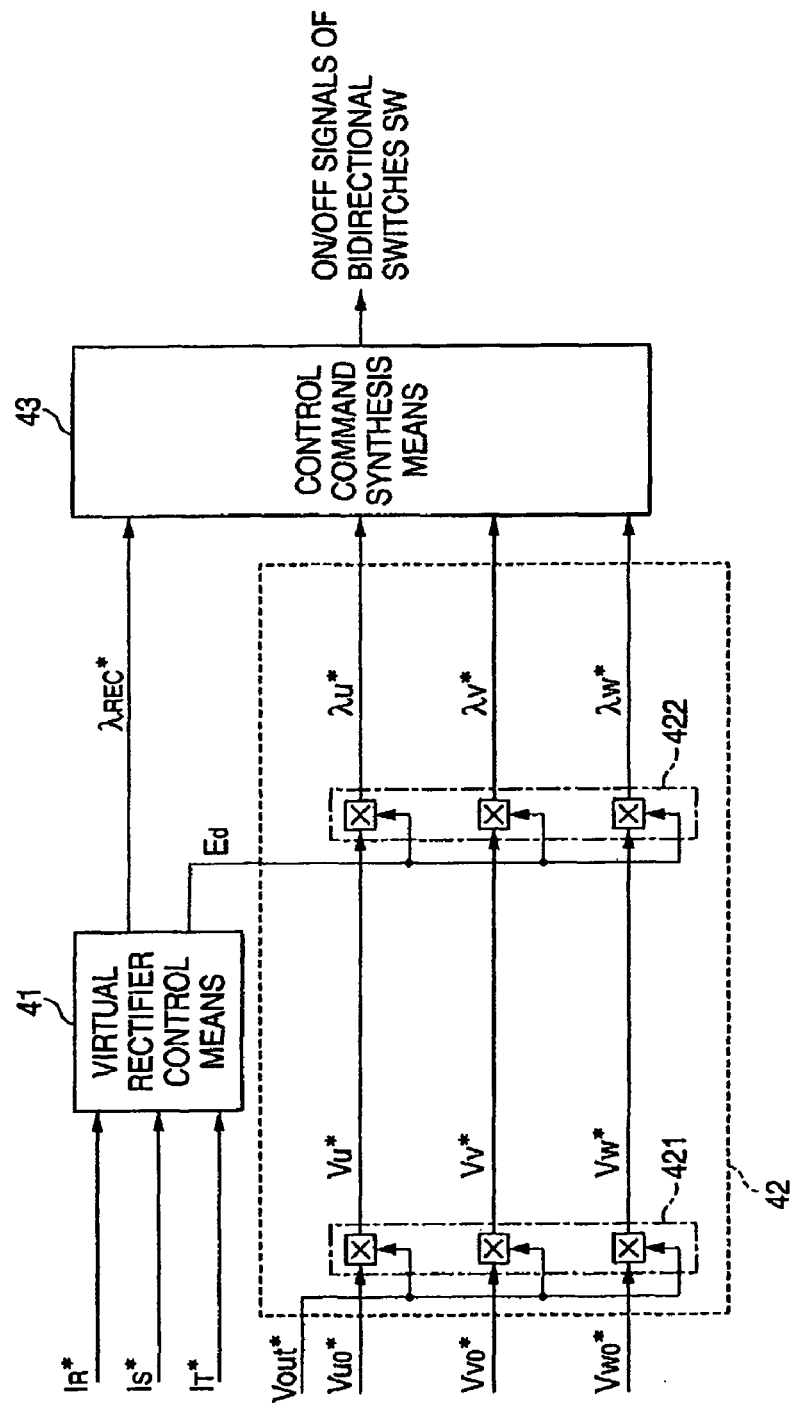
FIG. 13 is a block diagram of a control apparatus in the prior art.
Figure 14:
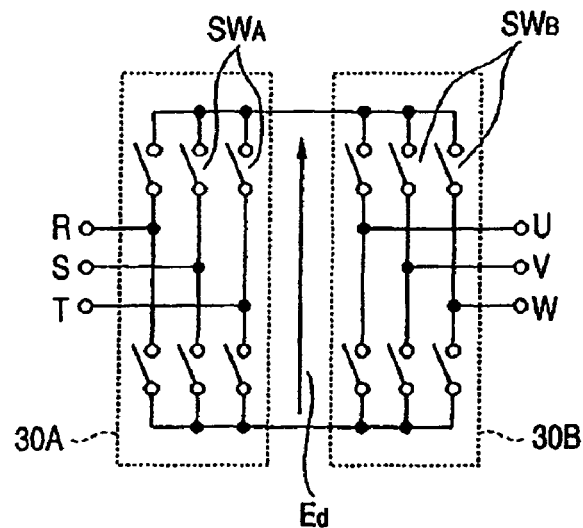
FIG. 14 is a configuration diagram of a virtual rectifier and a virtual inverter.
Figure 15:
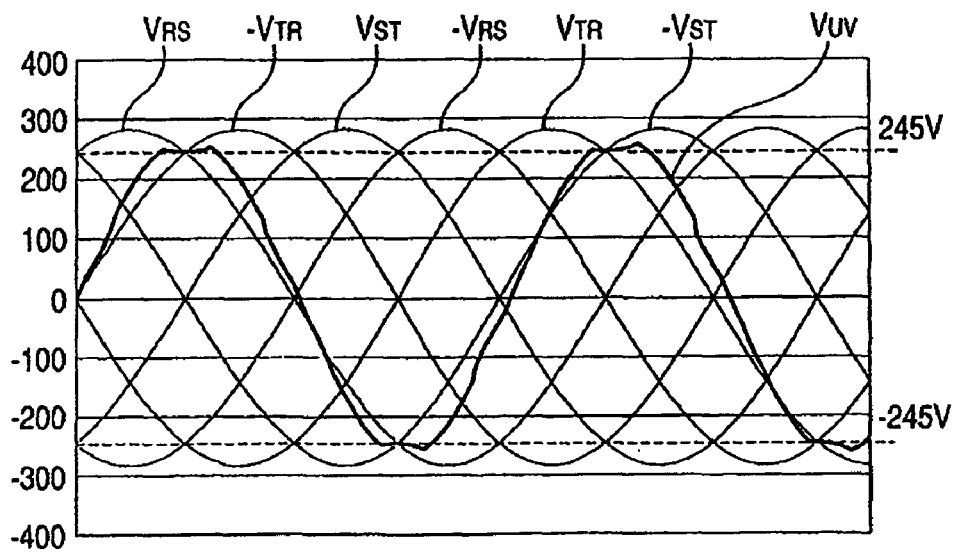
FIG. 15 is a diagram of input/output voltage waveforms in the prior art.

In FIG. 1, the same constituents as in FIG. 13 are assigned the same reference numerals and signs, and different parts will be chiefly described below.

In the control apparatus, virtual inverter control means 42A is provided with limitation means 423 for limiting output phase voltage command values $V_U{}^*$, $V_V{}^*$ and $V_W{}^*$ which are respectively obtained by multiplying an amplitude command value $V_{out}*$ and phase sinusoidal command values $V_{U0}*$, $V_{V0}*$ and $V_{W0}*$. Final output phase voltage command values $V_U$, $V_V$ and $V_W$ limited by the limitation means 423 are inputted to division means 422 so as to be used for divisions by a virtual DC link voltage $E_d$. By way of example, here is shown a case where the limitation means 423** limits the output phase voltage command values $V_U*$, $V_V*$ and $V_W*$ at ±0.75 pu (where "1.0 pu" represents the maximum value of supply phase voltages). That is, the peak-value limitation value of the output phase voltage command values based on the limitation means 423 is set at a value at which the maximum value of the output phase voltage command values becomes, at most, 0.75 times the supply-phase-voltage maximum value, and at which the minimum value thereof becomes, at least, 0.75 times the supply-phase-voltage minimum value.

Figure 2:
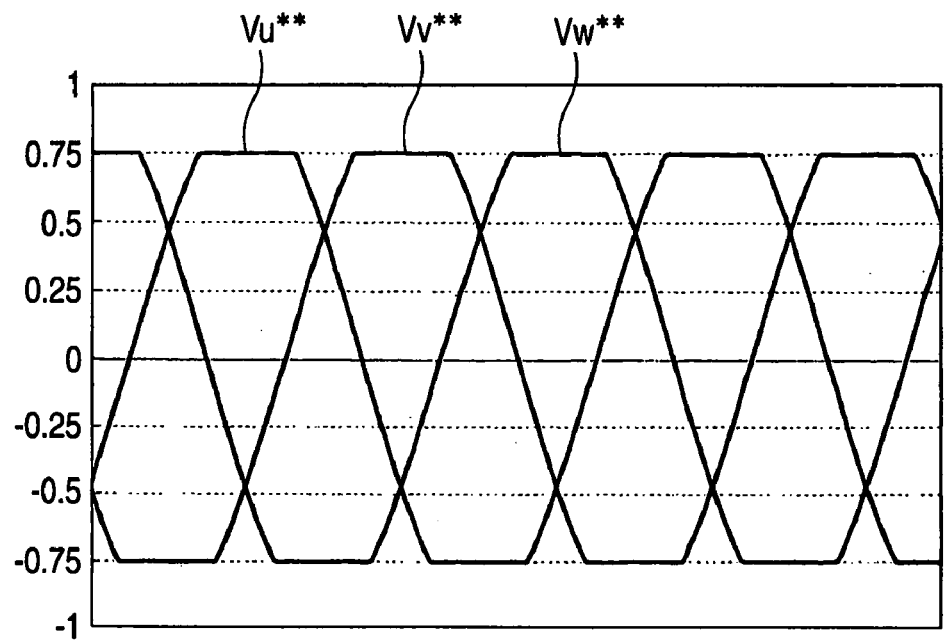
FIG. 2 is a waveform diagram of output phase voltage command values in the first embodiment.
Figure 3:
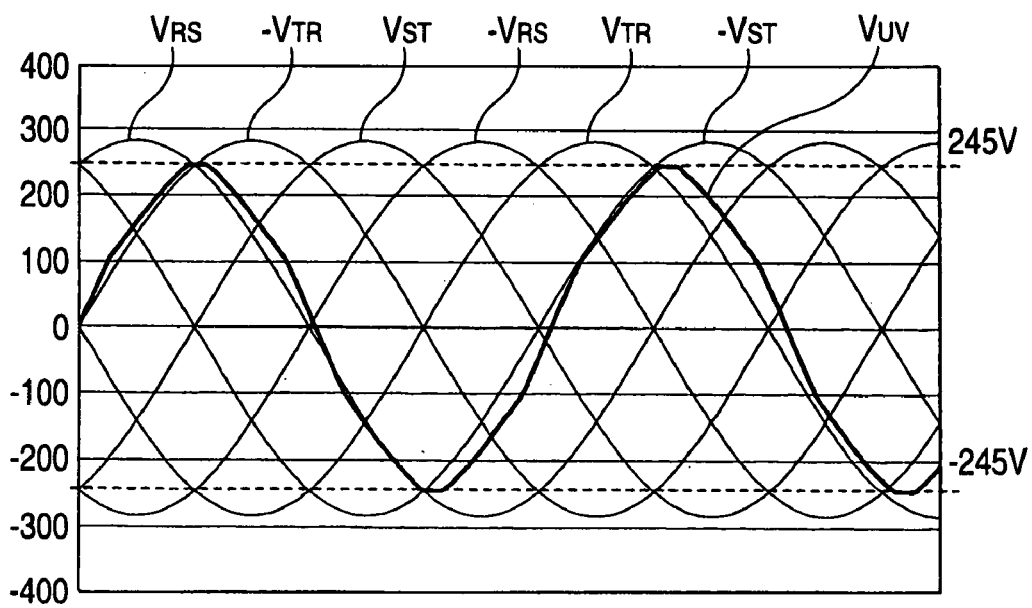
FIG. 3 is a waveform diagram of an output line voltage in the first embodiment.

In this embodiment, in a case where the effective value of supply line voltages is 200 V and where the control command of an output line voltage is set at a sinusoidal voltage whose effective value is 188 V, waveform examples of the output phase voltage command values $V_U$, $V_V$ and $V_W**$ and the output line voltage $V_{UV}$ in the case where the maximum value and minimum value of the output phase voltage command values $V_U*$, $V_V*$ and $V_W*$ are limited by ±0.75 times the supply-phase-voltage maximum value are respectively shown in FIG. 2 and FIG. 3.

In this case, the output phase voltage command values $V_U*$, $V_V*$ and $V_W*$ become sinusoidal command values whose maximum value is 0.94 pu (=188×√2/√3)/(200×√2/√3)). As, however, the maximum value and the minimum value are limited at ±0.75 pu by the limitation means 423, the output phase voltage command values $V_U$, $V_V$ and $V_W$ become substantially trapezoidal as shown in FIG. 2**.

The peak values of the output phase voltage command values are limited in this manner, whereby output voltages lie within the controllable voltage range of the matrix converter as shown in FIG. 3 (the maximum value of the output line voltage becomes, at most, 0.866 times the supply-line-voltage maximum value, and the minimum value thereof becomes, at least, 0.866 times the supply-line-voltage minimum value), and the distorted manner of the output voltage does not change every cycle of output.

Accordingly, even in the case where the motor is driven by the matrix converter, it is possible to prevent the nonuniform rotation of the motor and the occurrence of noise from the motor.

Incidentally, although the maximum value and minimum value of the output phase voltage command values $V_U*$, $V_V*$ and $V_W*$ are limited to ±0.75 pu as objects to-be-limited in FIG. 1, the objects to-be-limited are not restricted to the output phase voltage command values, and the limitation value is not restricted to ±0.75 pu, either. More specifically, as understood from FIG. 1, signals which are the objects to-be-limited may well be modulation signals $\lambda_V*$, $\lambda_V*$ and $\%\lambda_W*$, unlike the output phase voltage command values $V_U*$, $V_V*$ and $V_W*$. The limitation value in this case becomes (±0.75 pu÷$E_d$).

Figure 4:
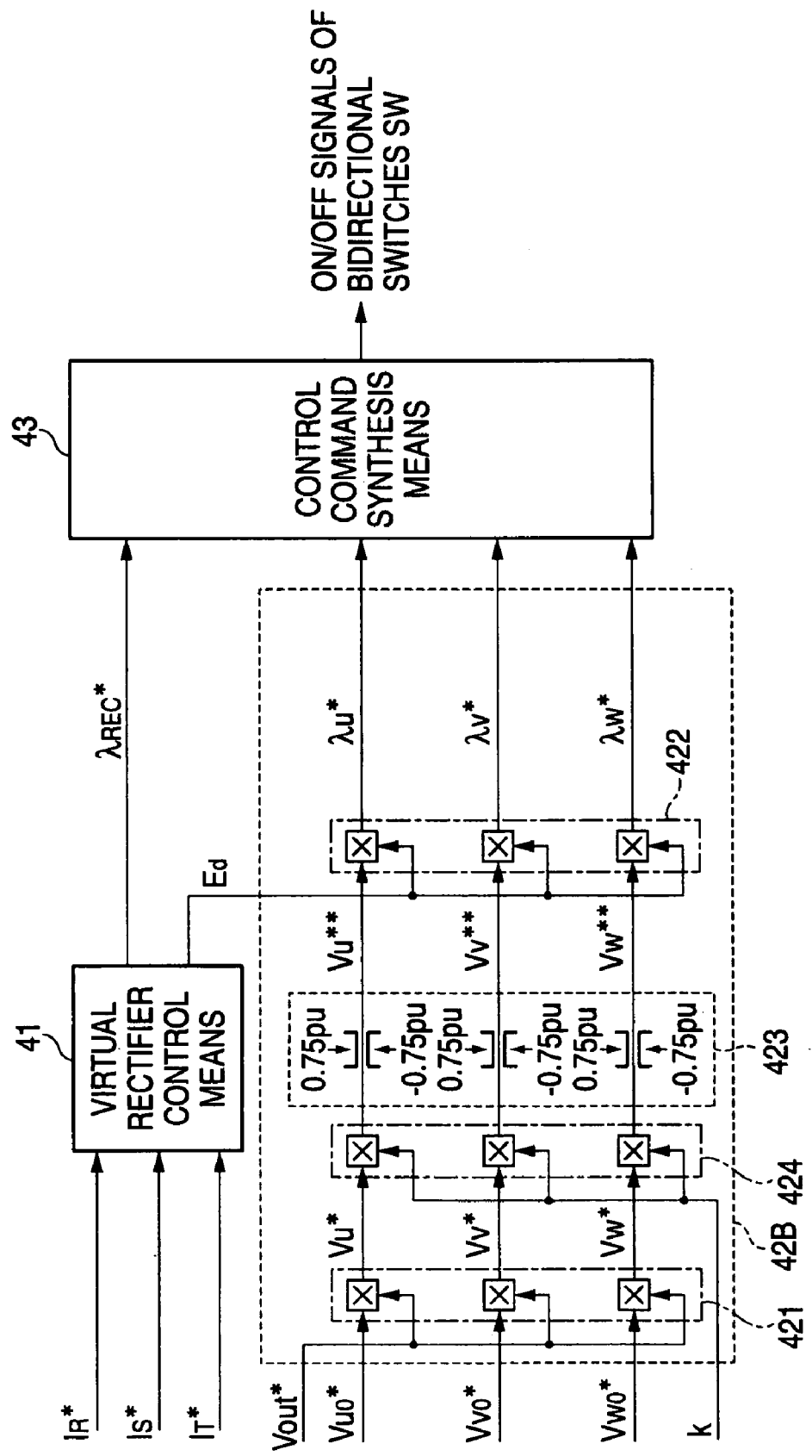
FIG. 4 is a block diagram showing a control apparatus according to a second embodiment of the invention.

Next, FIG. 4 is the block diagram of a control apparatus according to the second embodiment of the invention.

This control apparatus differs from the control apparatus in FIG. 1 in the point that virtual inverter control means 42B is provided with other multiplication means 424 between multiplication means 421 and limitation means 423, whereby output phase voltage command values $V_U*$, $V_V*$ and $V_W*$ outputted from the multiplication means 421 are multiplied by a correction coefficient k.

In the first embodiment, the output phase voltage command values $V_U*$, $V_V*$ and $V_W*$ are limited at 0.75 times the supply-phase-voltage maximum value. Therefore, notwithstanding that the output-line-voltage effective value is set at 188 V as the control command, the output-line-voltage effective value becomes low relative to the command value.

In order to solve this problem, in the second embodiment, the output phase voltage command values $V_U*$, $V_V*$ and $V_W*$ are multiplied by the preset correction coefficient k, and the maximum value and minimum value of the output phase voltage command values $V_U*$, $V_V*$ and $V_W*$ are thereafter limited by the limitation means 423, in order that the line-voltage effective value agreeing with the command value may be outputtable.

Figure 5:
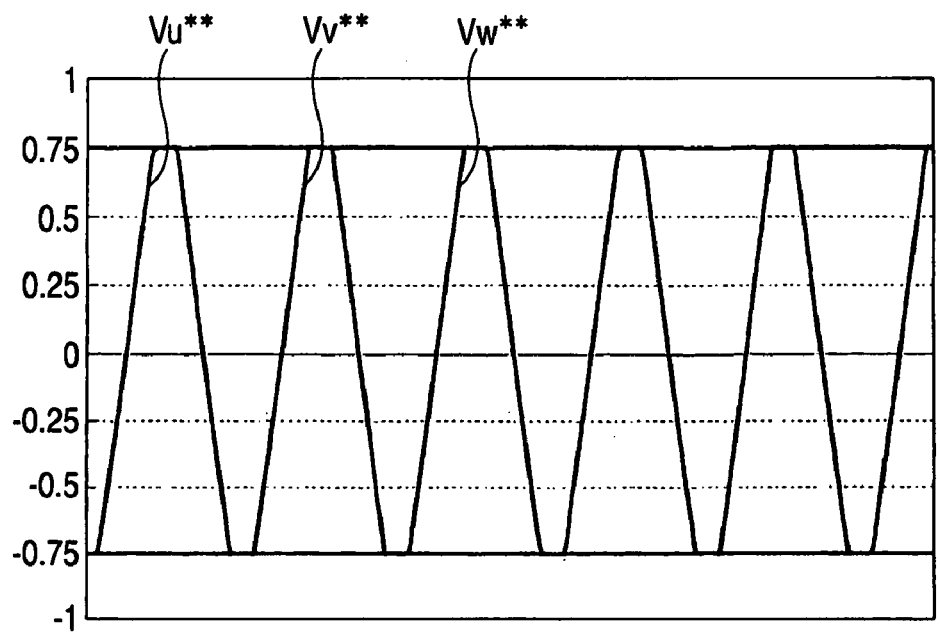
FIG. 5 is a waveform diagram of output phase voltage command values in the second embodiment.
Figure 6:
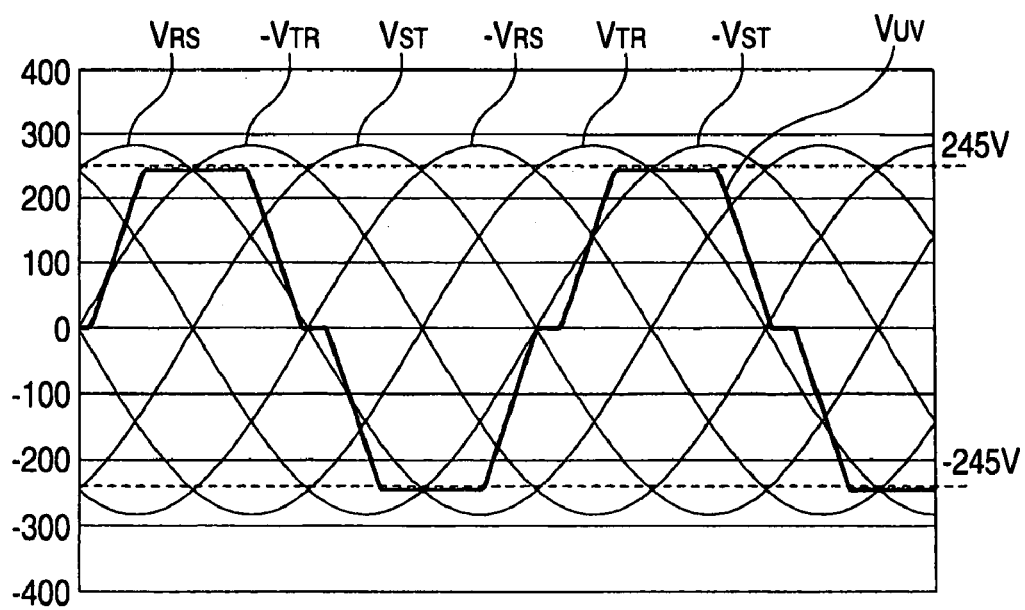
FIG. 6 is a waveform diagram of an output line voltage in the second embodiment.

FIG. 5 and FIG. 6 respectively show the waveforms of output phase voltage command values $V_U$, $V_V$ and $V_W**$ and an output line voltage $V_{UV}$ in the case where the output phase voltage command values $V_U*$, $V_V*$ and $V_W*$ are multiplied by the correction coefficient k and where the maximum value and minimum value thereof are limited by 0.75 times the supply-phase-voltage maximum value, in order that the output-line-voltage effective value may become 188 V when the effective value of supply line voltages is 200 V.

As seen from FIG. 5, output phase voltage command values $V_U$, $V_V$ and $V_W$ become trapezoidal. Besides, as shown in FIG. 6**, the output voltage $V_{UV}$ lies within the controllable voltage range of the matrix converter, and the distorted manner thereof is not apprehended to change every cycle of output, as in the first embodiment.

Although the maximum value and minimum value of the signals with the output phase voltage command values $V_U*$, $V_V*$ and $V_W*$ multiplied by the correction coefficient k are limited to ±0.75 pu in FIG. 4, objects to-be-limited are not restricted to the above signals, and the limitation value is not restricted to ±0.75 pu, either. More specifically, as understood from FIG. 4, signals which are the objects to-be-limited may well be modulation signals $\lambda_U*$, $\lambda_V*$ and $\lambda_W*$, and the limitation value in this case becomes (±0.75 pu÷$E_d$).

In the first and second embodiments, the original output phase voltage command values are set at the sinusoidal waves, and the maximum value and minimum value thereof are limited by 0.75 times the supply-phase-voltage maximum value. The original output phase voltage command values, however, may well be set at trapezoidal waves or square waves in which the maximum value of the original command values is, at most, 0.75 times the supply-phase-voltage maximum value, while the minimum value thereof is set at, at least, −0.75 times the supply-phase-voltage maximum value. In this case, as the trapezoidal waves are brought closer to the square waves, the output-line-voltage effective value can be enlarged more.

The idea according to which the waveforms of the output phase voltage command values are made the trapezoidal waves or square waves of predetermined magnitude in this manner, corresponds to the third embodiment of the invention.

Figure 7:
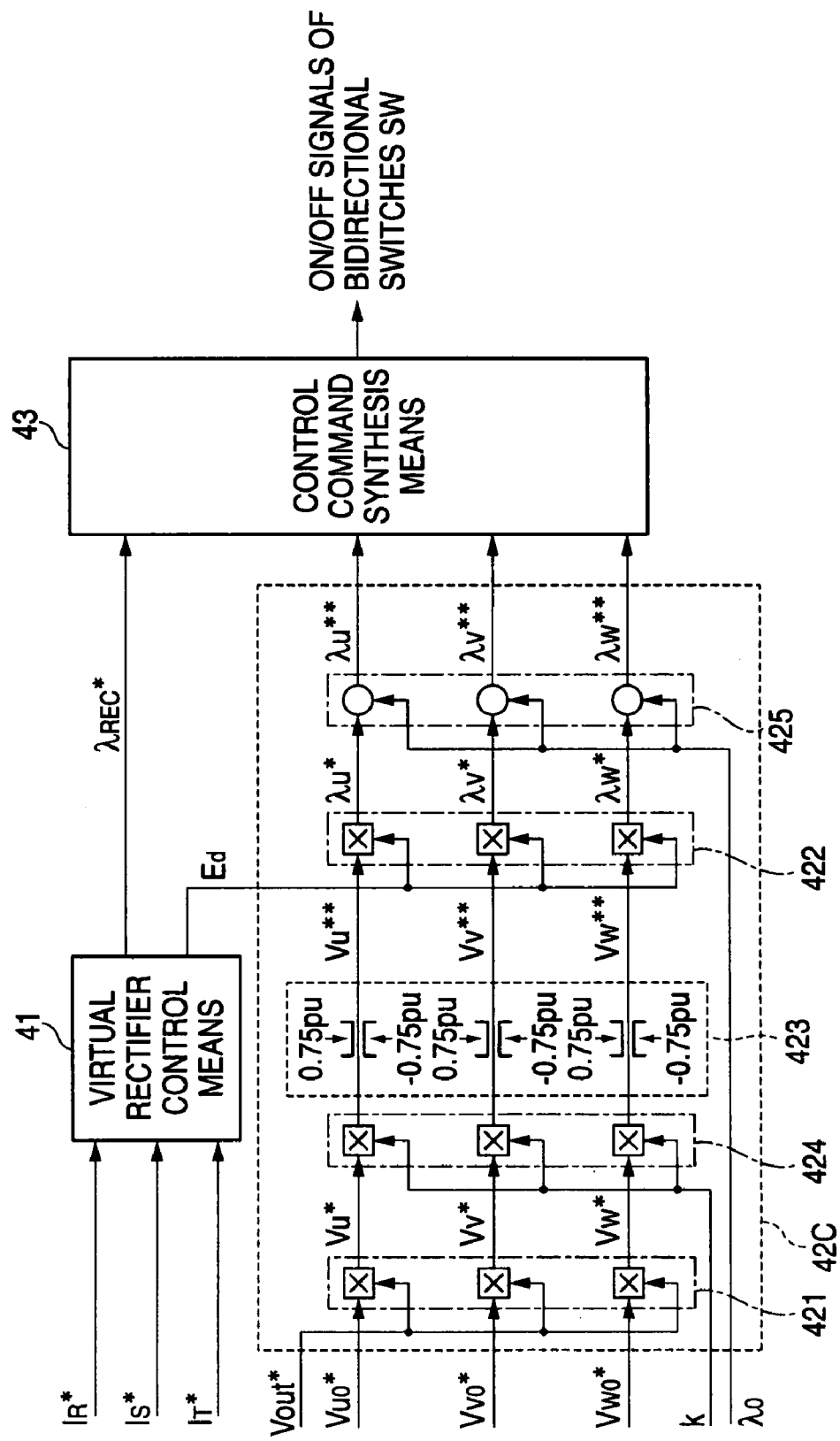
FIG. 7 is a block diagram showing a control apparatus according to a fourth embodiment of the invention.

Subsequently, FIG. 7 is the block diagram of a control apparatus according to the fourth embodiment of the invention.

This control embodiment differs from the second embodiment in FIG. 4 in the point that, in virtual inverter control means 42C, a correction signal $\lambda_0$ of identical phase and identical magnitude is added to modulation signals $\lambda_U*$, $\lambda_V*$ and $\lambda_W*$ of all of three phases by addition means 425, thereby to generate final modulation signals $\lambda_U$, $\lambda_V$ and $\lambda_W**$, in order that the modulation signal of at least one phase among the modulation signals $\lambda_U*$, $\lambda_V*$ and $\lambda_W*$ of a virtual inverter may become 1.0 or −1.0. Although no illustration is made, the idea of generating the final modulation signals $\lambda_U^{}$, $\lambda_V^{}$ and $\lambda_W^{**}$ by adding the correction signal $\lambda_0$ to the modulation signals $\lambda_U^*$, $\lambda_V^*$ and $\lambda_W^*$ as described above is also applicable to the first and third embodiments.

Although the maximum value and minimum value of the signals with output phase voltage command values $V_U^*$, $V_V^*$ and $V_W^*$ multiplied by a correction coefficient k are limited to ±0.75 pu in FIG. 7, objects to-be-limited are not restricted to the above signals, and the limitation value is not restricted to ±0.75 pu, either. More specifically, as understood from FIG. 7, signals which are the objects to-be-limited may well be the modulation signals $\lambda_U^*$, $\lambda_V^*$ and $\lambda_W^*$, and the limitation value in this case becomes (±0.75 pu÷$E_d$).

Figure 8:
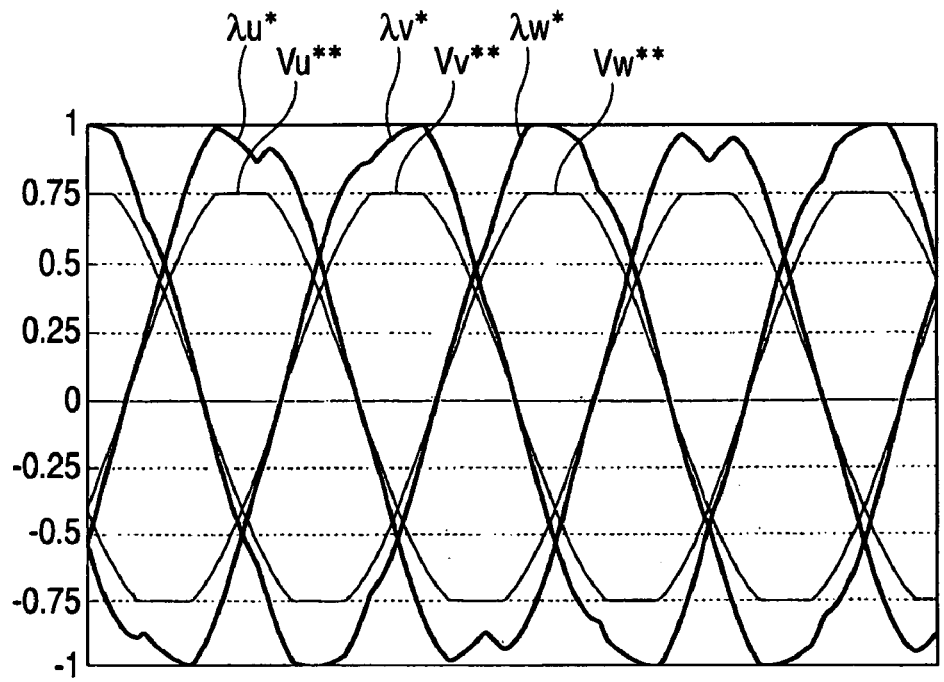
FIG. 8 is a waveform diagram of the modulation signals of a virtual inverter in the first to third embodiments of the invention.

FIG. 8 shows the output phase voltage command values $V_U^{}$, $V_V^{}$ and $V_W^{**}$ and the modulation signals $\lambda_U^*$, $\lambda_V^*$ and $\lambda_W^*$ of the virtual inverter in the first-third embodiments.

Figure 9:
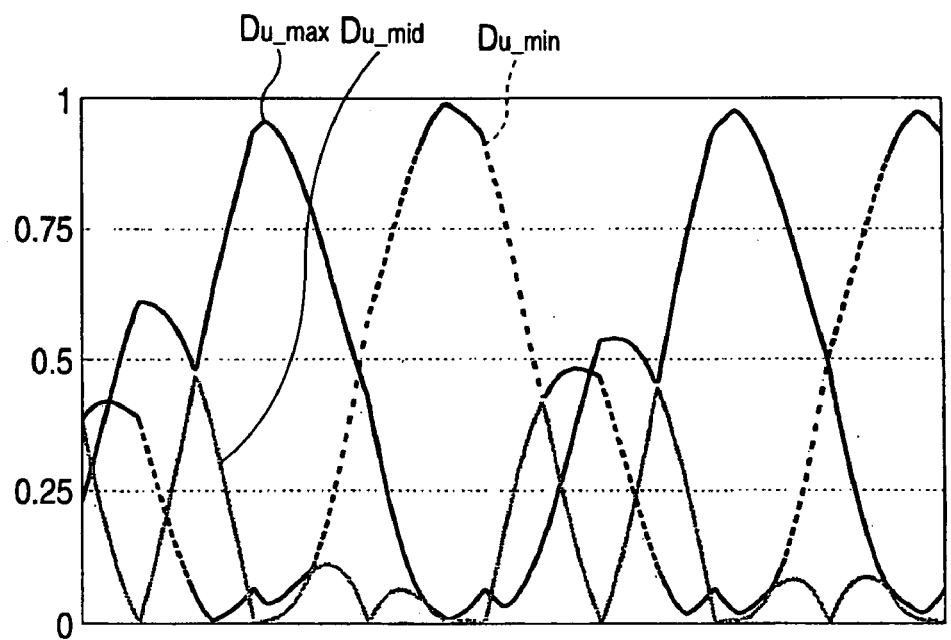
FIG. 9 is a waveform diagram of ON/OFF duty commands in the first to third embodiments.

Besides, FIG. 9 exemplifies the ON duty commands $D_{U\ MAX}$, $D_{U\ MID}$ and $D_{U\ MIN}$ of the bidirectional switches which connect the output U-phase of the matrix converter in the first-third embodiments and the maximum voltage phase, middle voltage phase and minimum voltage phase of the supply phase voltages thereof, respectively. Here, "ON duty" signifies a time rate at which the bidirectional switch constituting the matrix converter turns ON within one carrier (triangular wave) cycle, and the time rate is generated by control command synthesis means 43 in FIG. 7.

Figure 10:
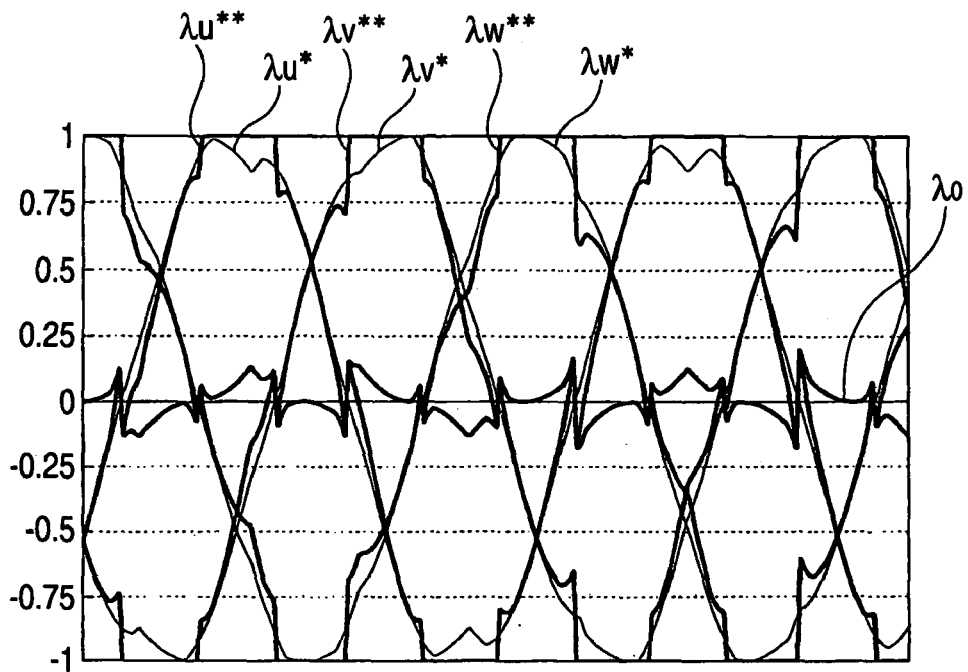
FIG. 10 is a waveform diagram of the modulation signals of a virtual inverter in the fourth embodiment.

On the other hand, FIG. 10 shows the modulation signals $\lambda_U^*$, $\lambda_V^*$ and $\lambda_W^*$ of the virtual inverter before the additions of the correction signal $\lambda_0$ in the fourth embodiment, and the final modulation signals $\lambda_U^{}$, $\lambda_V^{}$ and $\lambda_W^{}$ after the additions of the correction signal $\lambda_0$. Besides, FIG. 11 exemplifies ON duty commands $D_{UMAX}$, $D_{UMID}$ and $D_{UMIN}$ similar to the above. By the way, in this example, the correction signal $\lambda_0$ is set so that any of the modulation signals $\lambda_U^{}$, $\lambda_V^{}$ and $\lambda_W^{}$ may become 1.0 or −1.0 by adding the correction signal $\lambda_0$.

As understood by comparing FIG. 8 and FIG. 10, since the correction signal $\lambda_0$ is added in the fourth embodiment, one phase among the three-phase modulation signals of the virtual inverter is fixed to 1.0 or −1.0 at a certain point of time without fail. Incidentally, since the correction signal $\lambda_0$ is added to all of the three phases, the added signals are canceled in a line voltage waveform that is outputted, and quite the same waveform as in the case where the correction signal $\lambda_0$ is not added is outputted.

Figure 11:
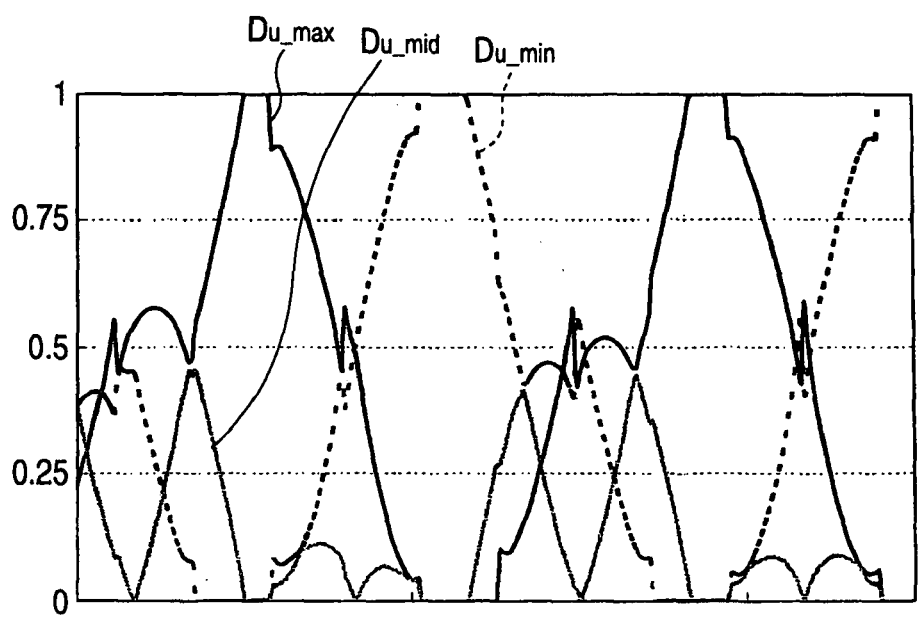
FIG. 11 is a waveform diagram of ON/OFF duty commands in the fourth embodiment.

Further, as understood by comparing FIG. 9 and FIG. 11, there exists a period for which the ON duty commands $D_{U\ MAX}$, $D_{U\ MID}$ and $D_{U\ MIN}$ of the bidirectional switches connected to the U-phase of the matrix converter are fixed to 1.0 or −1.0 by the addition of the correction signal $\lambda_0$ (this holds true of the other phases, and the illustration shall therefore be omitted). This eventually signifies that the bidirectional switches connected to one output phase of the matrix converter are fixed in an ON or OFF state within one carrier cycle. That is, according to the fourth embodiment, notwithstanding that the same voltage waveform as in the first-third embodiments is outputted, the numbers of times of the ON/OFF operations of the bidirectional switches can be decreased, and hence, the suffered loss of a power converter can be lowered.

Each of the foregoing embodiments is especially effective in the case of outputting a voltage effective value being, at least, the voltage effective value at which the matrix converter can output a sinusoidal voltage without distortion.

It will, of course, be appreciated that variations are possible, and that the invention may be practiced otherwise than as specifically disclosed herein, without departing from the scope thereof.

What is claimed is:

1. A control method for a power converter, comprising the steps of:
   converting a first AC voltage directly into a second AC voltage of a desired magnitude and a desired frequency by turning bidirectional switches on and off without employing an energy buffer;
   providing output phase voltage command values;
   providing supply voltages;
   obtaining final output phase voltage command values by limiting peak values of the output phase voltage command values in accordance with magnitudes of the supply voltages; and
   controlling the power converter according to the final output voltage command values,
   wherein final modulation signals, which have been obtained by adding a correction signal to modulation signals generated from the output phase voltage command values whose maximum value and minimum value are limited, are used as control commands for the power converter, and
   the correction signal is set so that the final modulation signal for at least one phase of an output side of the power converter may become 1.0 or −1.0 per unit, relative to a maximum phase voltage of the supply.

2. The control method according to claim 1, wherein an amplitude of an output line voltage is at least an effective value of a sinusoidal voltage that the power converter can output without distortion.

3. The control method according to claim 1, wherein an amplitude of an output line voltage is made, at most, 0.866 times an amplitude of a supply line voltage by limiting peak values of output phase voltage command values.

4. The control method according to claim 3, wherein an amplitude of an output line voltage is at least an effective value of a sinusoidal voltage that the power converter can output without distortion.

5. The control method according to claim 3, wherein a peak-value limit of output phase voltage command values is set at a value at which a maximum value of the output phase voltage command values becomes, at most, 0.75 times a maximum value of supply phase voltages, while a minimum value thereof becomes, at least, 0.75 times a minimum value of supply phase voltages.

6. The control method according to claim 5, wherein an amplitude of an output line voltage is at least an effective value of a sinusoidal voltage that the power converter can output without distortion.

7. The control method according to claim 5, wherein the peak-value limit of the output phase voltage command values which have been obtained by multiplying the output phase voltage command values by a correction coefficient that equalizes an effective value of the output line voltage to a command value is set at a value at which the maximum value of the output phase voltage command values becomes, at most, 0.75 times the maximum value of the supply phase voltages, while the minimum value thereof becomes, at least, 0.75 times the minimum value of the supply phase voltages.

8. The control method according to claim 7, wherein an amplitude of an output line voltage is at least an effective value of a sinusoidal voltage that the power converter can output without distortion.

9. The control method according to claim 5, wherein a waveform of the output phase voltage command values is made a trapezoidal wave or a square wave in which the maximum value of the output phase voltage command values is, at most, 0.75 times the maximum value of the supply phase voltages, while the minimum value thereof is, at least, 0.75 times the minimum value of the supply phase voltages.

10. The control method according to claim 9, wherein an amplitude of an output line voltage is at least an effective value of a sinusoidal voltage that the power converter can output without distortion.

11. A control method for a power converter, comprising the steps of:

converting a first AC voltage directly into a second AC voltage of a desired magnitude and a desired frequency by turning bidirectional switches on and off without employing an energy buffer;

providing modulation signals;

providing supply voltages;

obtaining final modulation signals by limiting peak values of the modulation signals in accordance with magnitudes of the supply voltages; and controlling the power converter according to the final modulation signals, wherein a correction signal is set so that at least one of the final modulation signals for at least one phase of an output side of the power converter may become 1.0 or −1.0 per unit, relative to a maximum phase voltage of the supply.

12. The control method according to claim 11, wherein an amplitude of an output line voltage is at least an effective value of a sinusoidal voltage that the power converter can output without distortion.

* * * * *